(12) United States Patent
Kim et al.

(10) Patent No.: US 10,321,159 B2
(45) Date of Patent: *Jun. 11, 2019

(54) APPARATUS AND METHOD OF PERFORMING FOURIER TRANSFORM

(71) Applicant: SAMSUNG ELECTRONICS CO., LTD., Suwon-si (KR)

(72) Inventors: Hojung Kim, Suwon-si (KR); Hoon Song, Yongin-si (KR); Hongseok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2 days.

This patent is subject to a terminal disclaimer.

(21) Appl. No.: 15/218,243

(22) Filed: Jul. 25, 2016

(65) Prior Publication Data

US 2017/0064333 A1     Mar. 2, 2017

(30) Foreign Application Priority Data

Aug. 27, 2015     (KR) .................. 10-2015-0121031

(51) Int. Cl.

| | | |
|---|---|---|
| *G06F 17/14* | (2006.01) | |
| *H04N 19/60* | (2014.01) | |
| *H04N 19/42* | (2014.01) | |
| *G03H 1/08* | (2006.01) | |

(52) U.S. Cl.
CPC .......... *H04N 19/60* (2014.11); *G03H 1/0808* (2013.01); *G06F 17/142* (2013.01); *H04N 19/42* (2014.11); *G03H 2210/30* (2013.01); *G03H 2226/02* (2013.01)

(58) Field of Classification Search
CPC ............... G06F 17/142; G03H 1/0808; G03H 2210/30; G03H 2226/02; H04N 19/42; H04N 19/60
See application file for complete search history.

(56) References Cited

U.S. PATENT DOCUMENTS

| | | | |
|---|---|---|---|
| 5,107,345 A | 4/1992 | Lee | |
| 5,596,604 A * | 1/1997 | Cioffi | .................... H04L 1/0065 375/260 |
| 5,814,820 A * | 9/1998 | Dong | .................... G02B 21/16 250/458.1 |
| 6,178,018 B1 | 1/2001 | Kekas et al. | |

(Continued)

FOREIGN PATENT DOCUMENTS

| | | |
|---|---|---|
| JP | 2000-066566 A | 3/2000 |
| JP | 2004-206254 A | 7/2004 |

(Continued)

OTHER PUBLICATIONS

David Harvey; "A Cache-Friendly Truncated FFT" ARXIV.org, Cornell University, Oct. 2008.*

(Continued)

*Primary Examiner* — Shaghayegh Azima
(74) *Attorney, Agent, or Firm* — Sughrue Mion, PLLC

(57) ABSTRACT

A method of performing a Fourier transform includes generating first data by performing a one-dimensional (1D) fast Fourier transform (FFT), on data having rows and columns, in a row direction; generating second data by performing the 1D FFT, on a portion of the first data, in a column direction; and storing a portion of the second data.

15 Claims, 10 Drawing Sheets

(56) References Cited

U.S. PATENT DOCUMENTS

| | | | | |
|---|---|---|---|---|
| 6,307,569 B1* | 10/2001 | Ratakonda | ............ | G06T 3/4084 345/660 |
| 6,411,978 B1 | 6/2002 | Naveh et al. | | |
| 7,230,424 B1* | 6/2007 | Morrone | ............ | G01R 33/4835 324/309 |
| 7,432,707 B1* | 10/2008 | Boitano | ................ | G01R 33/56 324/309 |
| 7,483,932 B1* | 1/2009 | Boucher | ............... | G06F 17/142 708/401 |
| 2003/0195938 A1* | 10/2003 | Howard | .................... | G06F 8/45 709/208 |
| 2004/0078405 A1* | 4/2004 | Bhanot | ..................... | G06F 9/52 708/404 |
| 2006/0245020 A1 | 11/2006 | Kawano et al. | | |
| 2007/0033244 A1* | 2/2007 | Cohen | .................. | G06F 17/142 708/404 |
| 2007/0222445 A1* | 9/2007 | Hertz | ................. | G01R 33/4818 324/307 |
| 2007/0297513 A1* | 12/2007 | Biswas | ................... | H04N 7/014 375/240.16 |
| 2008/0028013 A1* | 1/2008 | Kamegawa | ............ | G06F 17/142 708/400 |
| 2009/0219380 A1* | 9/2009 | Cable | .................. | G03H 1/0808 348/40 |
| 2009/0316240 A1* | 12/2009 | Hara | ..................... | G11B 7/0065 359/33 |
| 2010/0088356 A1* | 4/2010 | Lloyd | ................... | G06F 17/142 708/404 |
| 2011/0107060 A1* | 5/2011 | McAllister | ............ | G06F 17/142 712/22 |
| 2011/0278548 A1* | 11/2011 | Takezoe | ........... | B29D 11/00365 257/40 |
| 2012/0235855 A1* | 9/2012 | Kurtz | ........................ | G01S 7/35 342/109 |
| 2013/0299796 A1* | 11/2013 | Masuyama | ......... | B29C 33/3857 257/40 |
| 2013/0342758 A1* | 12/2013 | Greisen | ................. | G06T 3/0012 348/441 |
| 2014/0327566 A1* | 11/2014 | Burgio | ................... | G01S 13/72 342/108 |
| 2015/0352369 A1* | 12/2015 | Quan | ................... | A61N 1/3925 607/7 |
| 2016/0041524 A1 | 2/2016 | Song et al. | | |
| 2017/0103503 A1* | 4/2017 | Kim | ......................... | G06T 5/10 |
| 2017/0178281 A1* | 6/2017 | Kim | ......................... | G06T 9/00 |
| 2018/0060997 A1* | 3/2018 | Kim | ......................... | G06T 1/20 |

FOREIGN PATENT DOCUMENTS

| | | |
|---|---|---|
| JP | 2006-338851 A | 12/2006 |
| KR | 10-1366116 B1 | 2/2014 |

OTHER PUBLICATIONS

Communication dated Feb. 7, 2017 issued by the European Patent Office in counterpart European Patent Application No. 16184294.3.

David Harvey; "A Cache-Friendly Truncated FFT"; arxiv.org, Cornell University Library, 201 Olin Library Cornell University Ithaca, NY 14853, Oct. 17, 2008; XP080414269; 14 pgs. total.

Michel Gross et al; "Digital holography with Ultimate Sensitivity"; arxiv. org, Cornell University Library, 201 Olin Library Cornell University Ithaca, NY 14853; Mar. 20, 2008; XP080405385; 4 pgs. total.

* cited by examiner

APPARATUS AND METHOD OF PERFORMING FOURIER TRANSFORM

CROSS-REFERENCE TO RELATED PATENT APPLICATION

This application claims priority from Korean Patent Application No. 10-2015-0121031, filed on Aug. 27, 2015, in the Korean Intellectual Property Office, the disclosure of which is incorporated herein in its entirety by reference.

BACKGROUND

1. Field

Methods and apparatuses consistent with exemplary embodiments relate to a method and an apparatus for performing a Fourier transform.

2. Description of the Related Art

In a field of three-dimensional (3D) image technology, research has been actively conducted to develop apparatuses for realizing a high-definition hologram in real time by using a complex spatial light modulator (SLM) capable of simultaneously controlling an amplitude and a phase of light.

To reproduce a hologram moving picture, a computer-generated hologram (CGH) has been used. Image processing apparatuses perform a very large number of calculations to calculate a hologram value for each location on a hologram plane. In other words, to express a point on a space, image processing apparatuses need to perform a Fourier transform operation. To express an image of a space, image processing apparatuses need to perform as many Fourier transform operations as the number of corresponding pixels.

Image processing apparatuses, such as a television (TV) and a mobile device, can process image data to reproduce a hologram image. In this case, the image processing apparatuses can perform a Fourier transform on the image data and reproduce an image by using transformed data.

When the image processing apparatuses perform a Fourier transform, a large number of calculations are performed, and much time is taken. In particular, portable devices such as mobile devices are limited in size and available power. Thus, there is a demand for methods of reducing the number of calculations and/or the calculation time when image processing apparatuses perform a Fourier transform.

SUMMARY

One or more exemplary embodiments provide methods and apparatuses for reducing an amount of calculations when a Fourier transform is performed.

One or more exemplary embodiments also provide methods and apparatuses for reducing a capacity of a memory that is used when a Fourier transform is performed.

One or more exemplary embodiments also provide a non-transitory computer-readable recording medium having recorded thereon a computer program, which, when executed by a computer, causes the computer to perform any one of the above described methods.

According to an aspect of an exemplary embodiment, provided is a method of performing a Fourier transform, the method including: generating first data by performing a one-dimensional (1D) fast Fourier transform (FFT), on data having rows and columns, in a row direction; generating second data by performing the 1D FFT, on a portion of the first data, in a column direction; and storing a portion of the second data.

The generating the first data may include completing the 1D FFT in the row direction in response to the portion of the first data being generated.

The generating the second data may include completing the 1D FFT in the column direction in response to the second data being generated.

The portion of the first data may be based on a portion of columns of the first data, and the method may further include storing the portion of the first data in a memory.

The storing the portion of the second data may include storing a portion of rows of the second data in a buffer.

The portion of the first data may include a low frequency component from among the first data.

The portion of the second data may include a low frequency component from among the second data.

According to an aspect of an exemplary embodiment, provided is a method of performing a Fourier transform, the method including: generating first data by performing a one-dimensional (1D) fast Fourier transform (FFT), on data having rows and columns, in a column direction of data; generating second data by performing the 1D FFT, on a portion of the first data, in a row direction; and storing a portion of the second data.

According to an aspect of an exemplary embodiment, provided is an image processing apparatus for performing a Fourier transform, the image processing apparatus including: a first core configured to generate first data by performing a one-dimensional (1D) fast Fourier transform (FFT), on data having rows and columns, in a row direction; a memory configured to store a portion of the first data; a second core configured to generate second data by performing the 1D FFT, on the portion of the first data, in a column direction; and a buffer configured to store a portion of the second data.

The first core may complete the 1D FFT in the row direction in response to the second data being generated.

The second core may complete the 1D FFT in the column direction in response to the second data being generated.

The portion of the first data may correspond to a portion of columns of the first data.

The portion of the second data may correspond to a portion of rows of the second data.

The portion of the first data may include a low frequency component from among the first data.

The portion of the second data may include a low frequency component from among the second data.

According to an aspect of an exemplary embodiment, provided is an image processing apparatus for performing a Fourier transform, the image processing apparatus including: a first core configured to generate first data by performing a one-dimensional (1D) fast Fourier transform (FFT), on data having rows and columns, in a column direction; a memory configured to store a portion of the first data from among the first data; a second core configured to generate second data by performing the 1D FFT, on the portion of the first data, in a row direction; and a buffer configured to store a portion of the second data.

According to an aspect of an exemplary embodiment, provided is a non-transitory computer-readable recording medium having recorded thereon a computer program, which, when executed by a computer, causes the computer to perform the above method.

According to an aspect of an exemplary embodiment, provided is an image processing apparatus for performing a Fourier transform, the image processing apparatus including: N (N being a natural number of 2 or greater) first cores configured to generate first data by performing a one-dimensional (1D) fast Fourier transform (FFT), on data having an N×M (M being a natural number of 2 or greater) matrix form, in a row direction; a memory configured to store L (L being a natural number smaller than M) columns of the first data; L second cores configured to perform the 1D FFT on the L columns of the first data, in a column direction; and a buffer configured to store second data output by the L second cores.

The N first cores may respectively perform an M-point FFT.

The L second cores may respectively perform an N-point FFT.

The image processing apparatus may further include a first in, first out (FIFO) buffer configured to store the first data and output L columns selected from M columns of the first data to the memory.

The image processing apparatus may further include an interleaving buffer configured to output the L columns to the L second cores, respectively.

According to an aspect of an exemplary embodiment, provided is an image processing apparatus for performing a Fourier transform, the image processing apparatus including: first cores configured to generate first data by performing a one-dimensional (1D) fast Fourier transform (FFT), on data having rows and columns, in a row direction; a memory configured to store a portion of the first data; second cores configured to generate second data by performing the 1D FFT, on the portion of the first data, in a row direction; and a buffer configured to store a portion of the second data, wherein a number of the first cores corresponds to a number of columns of the data, and a number of the second cores corresponds to a number of rows of the portion of the first data.

According to an aspect of an exemplary embodiment, provided is an image processing apparatus including: a first core configured to perform a first one-dimensional (1D) fast Fourier transform (FFT), on at least a portion of data having rows and columns, in one of a row direction and a column direction; a second core configured to perform a second 1D FFT, on a portion of first data, obtained by performing the first 1D FFT, in another direction of the row direction and the column direction; and a controller configured to generate a hologram image based on a result of performing the first 1D FFT and the second 1D FFT.

The controller may select a portion of second data, obtained by performing the second 1D FFT, and generate the hologram image based on the selected portion of the second data.

The controller may generate the hologram image having pixels, corresponding to pixel values of the selected portion of the second data, and remaining pixels having pixel values of zero.

The portion of the first data may include at least one of a low frequency component and a high frequency component from among the first data.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
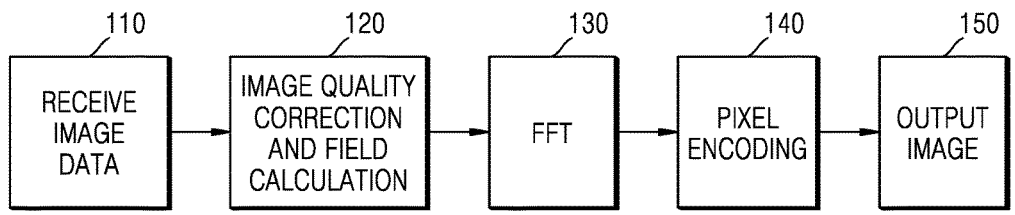
FIG. 1 is a schematic view illustrating a process of processing image data.

Certain exemplary embodiments will be described as follows with reference to the attached drawings wherein like reference numerals refer to the like elements throughout. The exemplary embodiments may have different forms and should not be construed as being limited to the descriptions set forth herein. Accordingly, the exemplary embodiments are merely described below, by referring to the figures, to explain aspects of the disclosure.

FIG. 1 is a schematic view illustrating a process of processing image data according to an exemplary embodiment. Referring to FIG. 1, an image processing apparatus may receive image data and output an image on which image processing is performed.

In operation 110, the image processing apparatus receives image data. For example, in computer-generated holography (CGH), when a layer based algorithm is applied to image data, the image data may include color data, depth data, or the like. The color data may include data representing a plurality of colors for each plane. The layer based algorithm may be used to implement a method of processing data of each of a plurality of planes into which a reproduction area of a hologram is split based on depths. The image processing apparatus may generate a hologram image by performing a Fourier transform or an inverse Fourier transform on the data of each of the planes.

In operation 120, the image processing apparatus performs image quality correction and/or field calculation. The image processing apparatus may correct the image data to improve an image quality of the image data.

In operation 130, the image processing apparatus performs a Fourier transform or fast Fourier transform (FFT). For example, the image processing apparatus may perform a Fourier transform on a two-dimensional (2D) matrix type of image data. The image processing apparatus may perform a one-dimensional (1D) Fourier transform twice to accomplish a 2D Fourier transform. The image processing apparatus may perform a 1D Fourier transform on the image data in a row direction and perform a 1D Fourier transform, on a result of the 1D Fourier transform, in a column direction. The image processing apparatus generates a hologram image via the Fourier transform.

The image processing apparatus may include a plurality of cores. The plurality of cores may perform a Fourier transform on the image data in parallel. For example, the image processing apparatus may allocate the image data of each plane to the plurality of cores, and the plurality of cores may perform a Fourier transform on the allocated image data.

A process in which the image processing apparatus performs a Fourier transform on the image data according to exemplary embodiments will be described below in detail with reference to FIGS. 2-6.

In operation 140, the image processing apparatus performs pixel encoding. The image processing apparatus generates data that is to be input to provide a screen, via the pixel encoding.

In operation 150, the image processing apparatus outputs an image to an image display.

The image processing apparatus according to an exemplary embodiment may reduce the number of calculations by performing a Fourier transform on only a portion of the image data in operation 140. For example, the portion of the image data may be data on which at least one or more calculations are to be performed. The image processing apparatus may also reduce an amount of data that is to be stored in a memory, by storing only a portion of the image data in operation 140.

Figure 2:
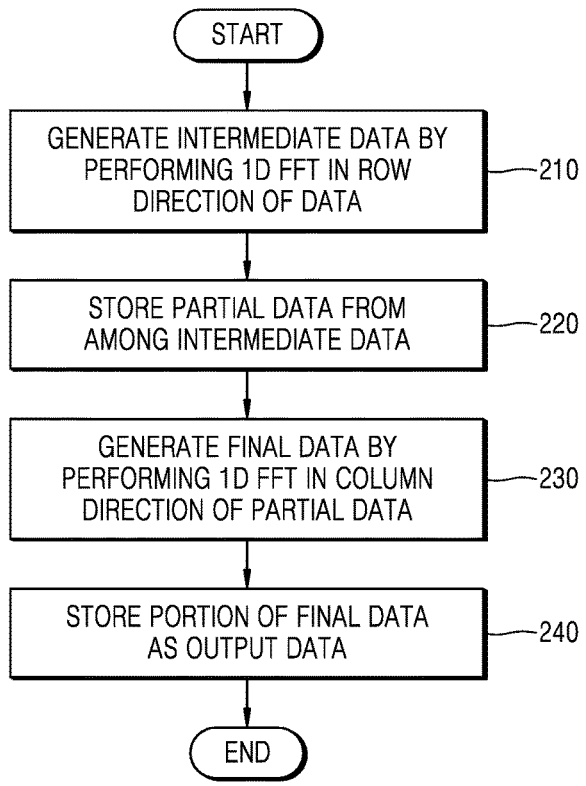
FIG. 2 is a flowchart of a Fourier transforming method according to an exemplary embodiment.

FIG. 2 is a flowchart of a Fourier transforming method according to an exemplary embodiment.

In operation 210, the image processing apparatus according to an exemplary embodiment generates intermediate data by performing a 1D FFT in a row direction of data, which may be of a 2D matrix type. In other words, the image processing apparatus according to an exemplary embodiment performs a 1D FFT on pixel values included in each row.

In operation 220, the image processing apparatus according to an exemplary embodiment stores partial data from among the intermediate data. The image processing apparatus may store, for example, only partial data including a low frequency component (or relatively low frequency component) from among the intermediate data. For example, the low frequency component may exist in a center portion of the intermediate data. The image processing apparatus may store only data, included in some columns in the center portion of the intermediate data, in the memory.

Similarly, the image processing apparatus may store, for example, only partial data including a high frequency component (or relatively high frequency component) from among the intermediate data. For example, the high frequency component may exist in the center portion of the intermediate data.

In operation 230, the image processing apparatus according to an exemplary embodiment generates final data by performing a 1D FFT in a column direction of the partial data. The image processing apparatus performs a 1D FFT on pixel values included in each column of the partial data.

In operation 240, the image processing apparatus according to an exemplary embodiment stores a portion of the final data as output data. The image processing apparatus may store, for example, only output data including a low frequency component from among the final data. For example, the low frequency component may exist in a center portion of the final data. Thus, the image processing apparatus may store only data included in some rows of the final data.

Figure 3:
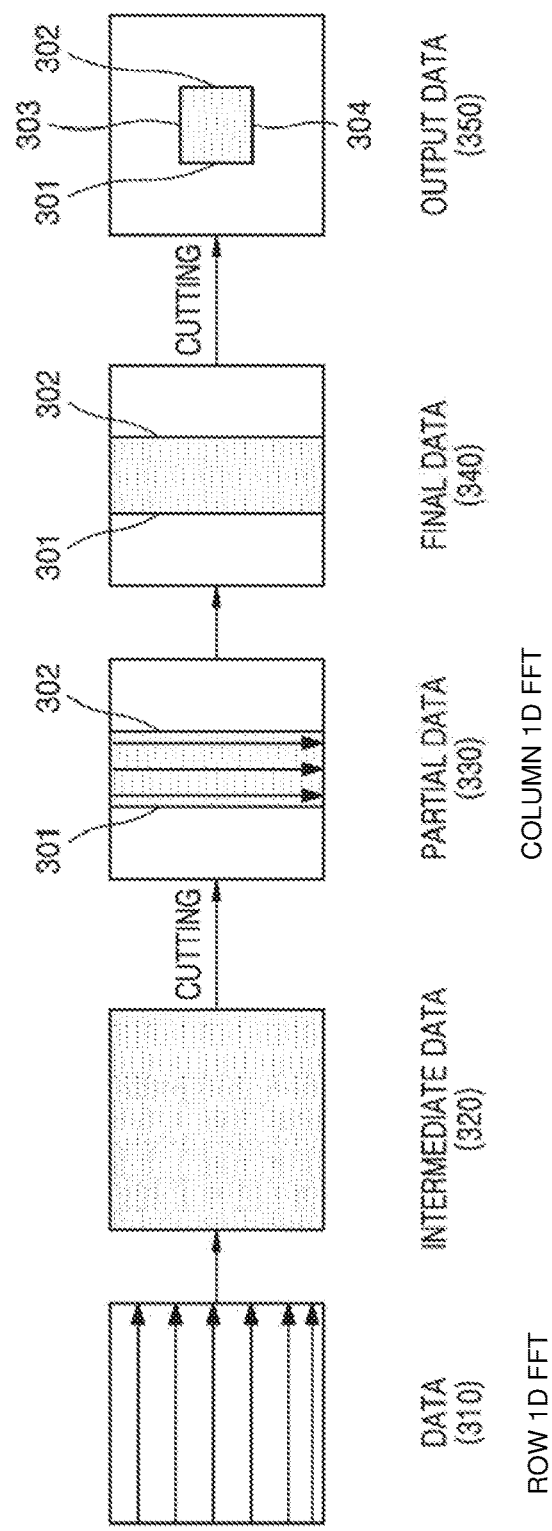
FIG. 3 illustrates an operation of performing a Fourier transform according to an exemplary embodiment.

FIG. 3 illustrates an operation of performing a Fourier transform according to an exemplary embodiment. Although data is expressed as a rectangle for convenience of explanation in FIG. 3, the data may be understood as a collection of pixels values, and arrows indicate a process in which an image processing apparatus performs an FFT on the pixel values.

The image processing apparatus according to an exemplary embodiment performs a 1D FFT on data 310 in a row direction.

Intermediate data 320 includes data obtained by transforming the data 310 in the row direction. In other words, the intermediate data 320 includes transformed pixel values.

Partial data 330 indicates a portion of the intermediate data 320. For example, the image processing apparatus may store only a portion of the intermediate data 320 in a memory. In other words, the image processing apparatus may store, as the partial data 330, only pixel values between a boundary 301 and a boundary 302 from among the intermediate data 320, in the memory. Thus, the image processing apparatus may reduce an amount of data to be stored (or a usage of a storage space of the memory) by storing only the partial data 330 in the memory, compared with the case of storing the entire portion of the intermediate data 320 in the memory.

The image processing apparatus may select some pixel values from the intermediate data 320 and generate the partial data 330 based on the selected pixel values of the intermediate data 320 and remaining pixel values of zero. A shaded portion of the partial data 330 indicates the selected pixel values of the intermediate data 320, and white portions of the partial data 330 indicate pixel values of zero.

The image processing apparatus performs a 1D FFT on the partial data 330 in a column direction. Arrows marked on the partial data 330 indicate directions in which a 1D FFT is performed.

Final data 340 includes data obtained by transforming the partial data 330 in the column direction. Consequently, the final data 340 includes data obtained by performing a 2D Fourier transform on the data 310 in the row direction and the column direction.

The image processing apparatus may store only a portion of the final data 340 in the memory. Output data 350 indicates a portion of the final data 340. The image processing apparatus may store, as the output data 330, only pixel values defined by boundaries 301-304 from among the final data 340, in the memory.

The image processing apparatus may also select some pixel values from the final data 340 and generate the output data 350 based on the selected pixel values of the final data 340 and remaining pixel values of zero. A shaded portion of the output data 350 indicates the pixel values of the final data 340, and white portions of the output data 350 indicate pixel values of zero.

Figure 4:
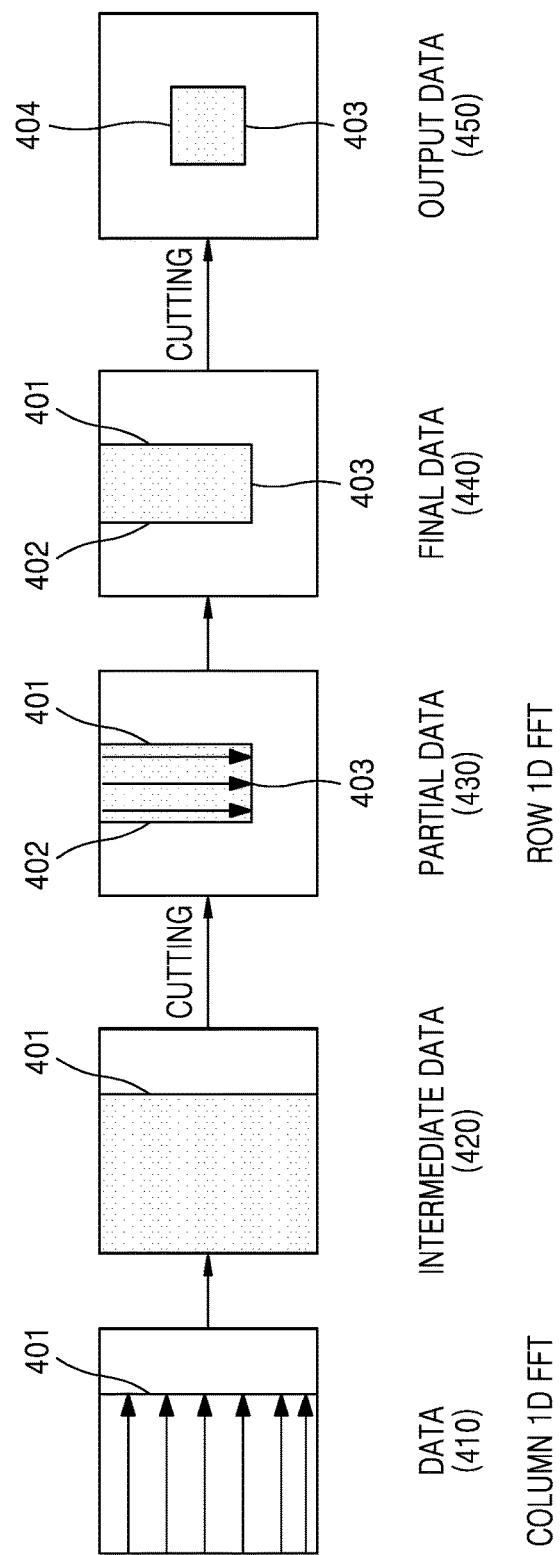
FIG. 4 illustrates an operation of performing a Fourier transform according to another exemplary embodiment.

FIG. 4 illustrates an operation of performing a Fourier transform according to another exemplary embodiment. Referring to FIG. 4, when the image processing apparatus acquires data used to generate output data 450, the image processing apparatus may early conclude a Fourier transform and reduce a calculation amount.

The image processing apparatus performs a Fourier transform on the data 410 in a row direction, up to a boundary 401 of data 410. In other words, the image processing apparatus calculates Fourier transform values (or Fourier transformed pixel values) for pixels within the boundary 401.

Intermediate data 420 includes data obtained by transforming the data 410 in the row direction. In other words, the intermediate data 420 includes transformed pixel values.

The image processing apparatus stores partial data 430 including transform values for pixels defined by boundaries 401, 402, and 403 of the intermediate data 420, in a memory.

The partial data 430 includes the transform values for pixels defined by boundaries 401-403, and the remaining pixel values may be zero.

The image processing apparatus performs a Fourier transform on the partial data 430 in a column direction, up to the boundary 403. In detail, the image processing apparatus performs a Fourier transform on the pixel values defined by the boundaries 401-403 of the partial data 430.

Final data 440 includes data obtained by transforming the partial data 430 in the column direction. Consequently, the final data 440 includes data obtained by performing a 2D Fourier transform on the data 410 in the row direction and the column direction.

The image processing apparatus may store only a portion of the final data 440 in the memory. The output data 450 includes data defined by the boundaries 401-403 and a boundary 404 of the final data 440. Remaining pixel values of the output data 450 may be zero. In other words, a shaded portion of the output data 450 indicates the pixel values of the final data 440, and white portions of the output data 450 indicate pixel values of zero.

Figure 5:
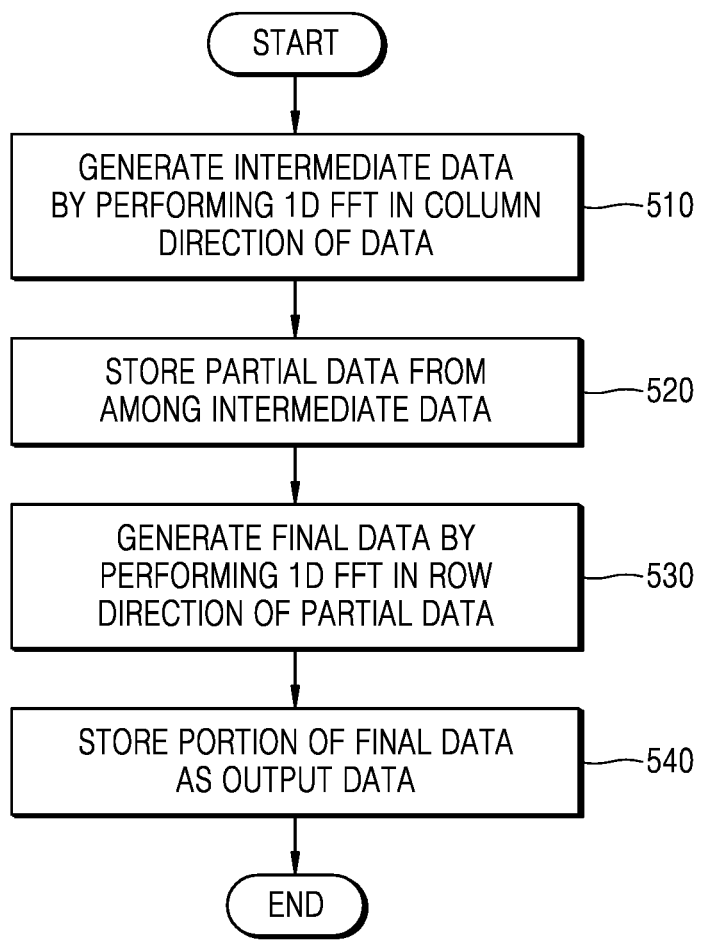
FIG. 5 is a flowchart of a Fourier transform according to another exemplary embodiment.

FIG. 5 is a flowchart of a Fourier transform according to another exemplary embodiment. According to another exemplary embodiment, the image processing apparatus may perform a Fourier transform in an order of a column and a row, which is different from the embodiment of FIG. 2.

In operation 510, the image processing apparatus generates intermediate data by performing a 1D FFT in a column direction of data. The data may be of a 2D matrix type, and the image processing apparatus performs a 1D FFT on pixel values included in each column.

In operation 520, the image processing apparatus stores partial data from among the intermediate data. The image processing apparatus may store only partial data including a low frequency component, from among the intermediate data. For example, the low frequency component may exist in the center portion of the intermediate data. The image processing apparatus may store only data included in some rows in the center portion of the intermediate data in the memory.

In operation 530, the image processing apparatus generates final data by performing a 1D FFT, in a row direction, on the partial data. The image processing apparatus performs a 1D FFT on pixel values included in each row of the partial data.

In operation 540, the image processing apparatus stores a portion of the final data as output data. The image processing apparatus may store only output data including a low frequency component from among the final data. For example, the low frequency component may exist in the center portion of the final data. Thus, the image processing apparatus may store only data included in some columns of the final data.

Figure 6:
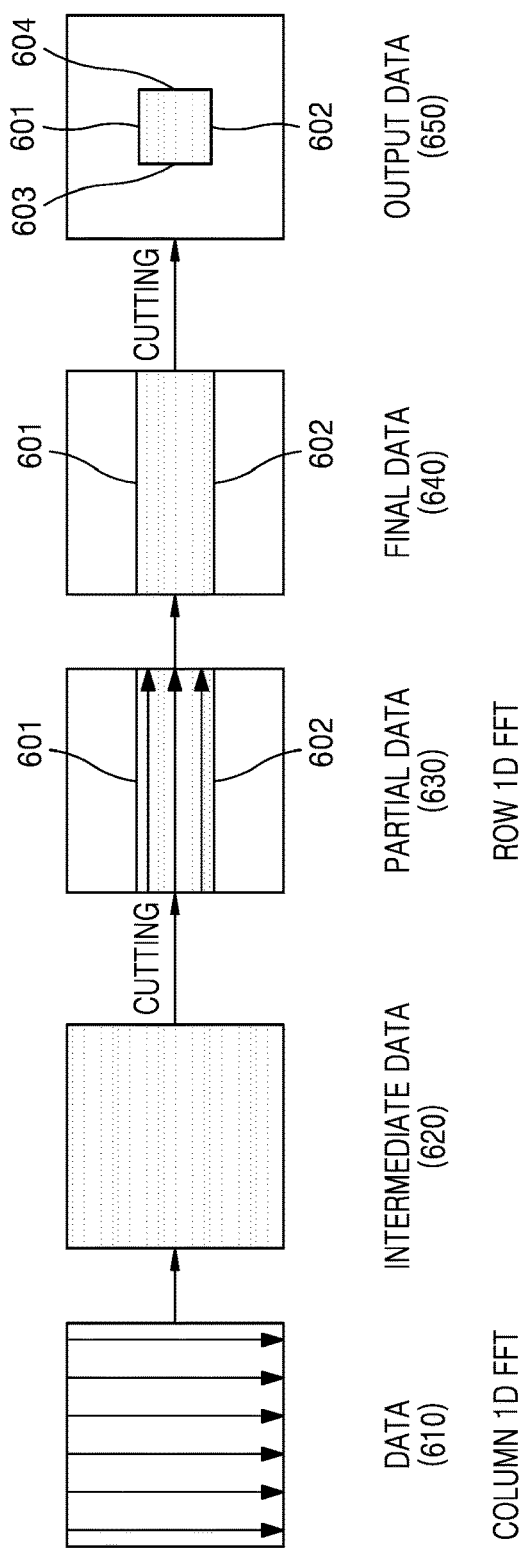
FIG. 6 illustrates an operation of performing a Fourier transform according to another exemplary embodiment.

FIG. 6 illustrates an operation of performing a Fourier transform according to another exemplary embodiment. Although data is expressed as a rectangle for convenience of explanation in FIG. 6, the data may be understood as a collection of pixels values, and arrows indicate an FFT that is performed on the pixel values by an image processing apparatus.

The image processing apparatus performs a 1D FFT on data 610 in a column direction.

Intermediate data 620 includes data obtained by transforming the data 610 in the column direction. In other words, the intermediate data 620 includes transformed pixel values.

Partial data 630 indicates a portion of the intermediate data 620. The image processing apparatus may store only a portion of the intermediate data 620, in a memory. In other words, the image processing apparatus may store, as the partial data 630, only a portion of pixel values of the intermediate data 620. For example, the image processing apparatus may store, as the partial data 630, pixel values between a boundary 601 and a boundary 602 from among the intermediate data 620, in the memory. Thus, the image processing apparatus may reduce an amount of data to be stored (or a usage of a storage space of the memory) by storing only the partial data 630 in the memory, compared with storing the entire portion of the intermediate data 620 in the memory.

The image processing apparatus may select some pixel values from the intermediate data 620 and generate the partial data 630 based on the selected pixel values and the remaining pixel values of zero. A shaded portion of the partial data 630 indicates the pixel values of the intermediate data 620, and white portions of the partial data 630 indicate pixel values of zero.

The image processing apparatus performs 1D FFT on the partial data 630 in a row direction. Arrows marked on the partial data 630 indicate directions in which 1D FFT is performed.

Final data 640 includes data obtained by transforming the partial data 630 in the column direction. Consequently, the final data 640 includes data obtained by performing a 2D Fourier transform on the data 610 in the column direction and the row direction.

The image processing apparatus may store only a portion of the final data 640 in the memory. Output data 650 indicates a portion of the final data 640. The image processing apparatus may store, as the output data 630, only pixel values defined by boundaries 601, 602, 603, and 604, from among the final data 640 in the memory.

The image processing apparatus may also select some pixel values from the final data 640 and generate the output data 650 by filling the remaining pixel values with 0. A shaded portion of the output data 650 indicates the pixel values of the final data 640, and white portions thereof indicate pixel values of 0.

Figure 7:
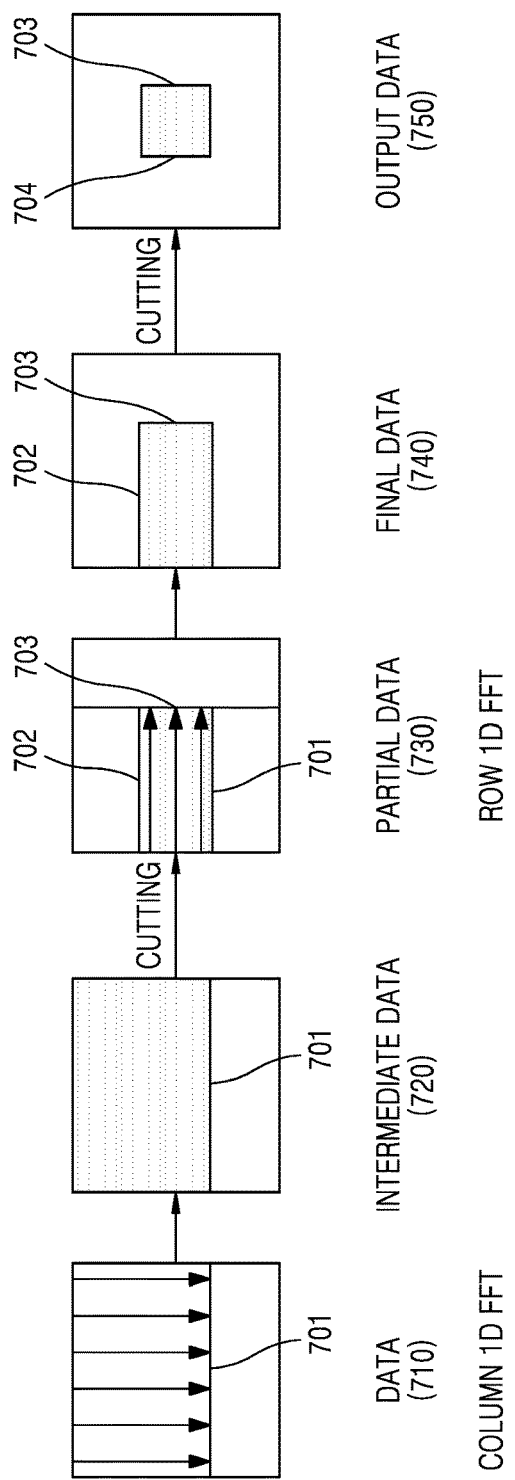
FIG. 7 illustrates an operation of performing a Fourier transform according to another exemplary embodiment.

FIG. 7 illustrates an operation of performing a Fourier transform according to another exemplary embodiment. Referring to FIG. 7, when the image processing apparatus acquires data used to generate output data 750, the image processing apparatus may early conclude Fourier transform and reduce a calculation amount.

The image processing apparatus performs a Fourier transform up to a boundary 701 of data 710 in a column direction. In other words, the image processing apparatus calculates Fourier transform values for the pixels within the boundary 701.

Intermediate data 720 includes data obtained by transforming the data 710 in the column direction. In other words, the intermediate data 720 includes transformed pixel values.

The image processing apparatus stores partial data 730 including transform values defined by boundaries 701, 702, and 703 of the intermediate data 720, in a memory. The partial data 730 includes the transform values defined by boundaries 701-703, and the remaining pixel values may be zero.

The image processing apparatus performs a Fourier transform on the partial data 730 in a row direction, up to the boundary 703. In detail, the image processing apparatus performs a Fourier transform on the pixel values defined by the boundaries 701-703 of the partial data 730.

Final data 740 includes data obtained by transforming the partial data 730 in the row direction. Consequently, the final data 740 includes data obtained by performing a 2D Fourier transform on the data 710 in the column direction and the row direction.

The image processing apparatus may store only a portion of the final data 740 in the memory. The output data 750 includes data defined by the boundaries 701-703 and a boundary 704, from among the final data 740. Remaining pixel values of the output data 750 may be zero. In other words, a shaded portion of the output data 750 indicates the pixel values of the final data 740, and white portions thereof indicate pixel values of zero.

Figure 8:
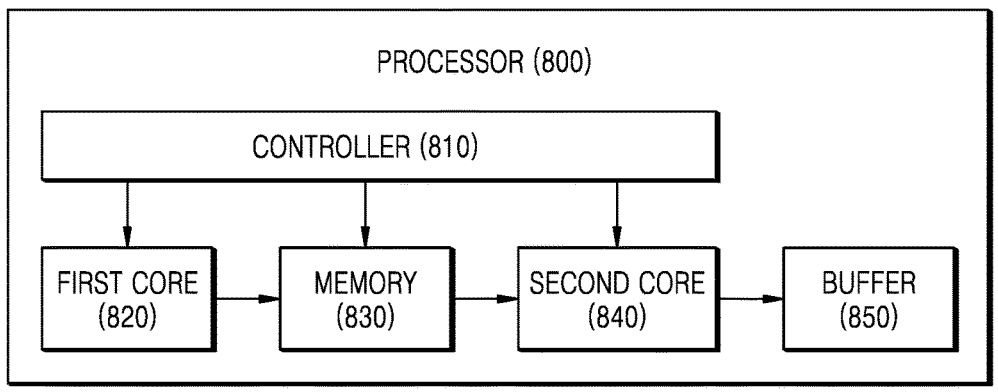
FIG. 8 is a block diagram of an image processing apparatus according to an exemplary embodiment.

FIG. 8 is a block diagram of an image processing apparatus according to an exemplary embodiment. Referring to FIG. 8, a processor 800 may be an example of an image processing apparatus or a Fourier transforming apparatus.

The processor 800 includes a controller 810, a first core 820, a memory 830, a second core 840, and a buffer 850. Although the processor 800 includes two cores, namely, the first and second cores 820 and 840, in FIG. 8, the processor 800 may include more than two cores.

The controller 810 controls the first core 820, the memory 830, and the second core 840, for example. The controller 810 may designate operations that are to be performed by the first and second cores 820 and 840. For example, the controller 810 may control the first core 820 to perform a 1D FFT on data in a row direction. The controller 810 may control the first core 820 to perform a 1D FFT on only a portion of the data in the row direction. The controller 810 may also control the second core 840 to perform a 1D FFT on data in a column direction. The controller 810 may control the second core 840 to perform a 1D FFT on only a portion of the data in a column direction.

The controller 810 may store resultant data obtained by the first core 820, in the memory 830. The controller 810 may store only a desired data from among the resultant data, in the memory 830. For example, the controller 810 may store partial data from among the resultant data obtained by the first core 820, in the memory 830.

The controller 810 may designate data that is to be read from the memory 830 by the first core 840. For example, the controller 810 may output resultant data sequentially stored in the row direction, to the second core 840 in the column direction. On the other hand, the controller 810 may output resultant data sequentially stored in the column direction, to the second core 840 in the row direction.

The controller 810 may store resultant data obtained by the second core 840, in a buffer 850. The controller 810 store only a desired data from among the resultant data, in the buffer 850. For example, the controller 810 may store partial data from among the resultant data obtained by the second core 840, in the buffer 850. The controller 810 may generate a three-dimensional (3D) image (e.g., hologram image) by using the partial data stored in the buffer 850.

The first core 820 may perform a Fourier transform on data. For example, the first core 820 may perform a 1D FFT on image data in a row direction or in a column direction. The first core 820 may output only a portion of transformed data to the memory 830. For example, the first core 820 may output only one fourth of the transformed data to the memory 830, or may output only data corresponding to a low frequency component from among the transformed data to the memory 830.

The second core 840 may perform a Fourier transform on data. For example, the second core 840 may perform a 1D FFT on image data in a column direction or in a row direction. The second core 840 may output only a portion of transformed data to the buffer 850. The second core 840 may output only one fourth of the transformed data to the buffer 850, or may output only data corresponding to a low frequency component from among the transformed data to the buffer 850.

By performing a Fourier transform on only a portion of data, the processor 800 may reduce a calculation amount and/or calculation time associated with performing the Fourier transform. Moreover, by storing only a portion of data in the memory 830 or the buffer 850, the processor 800 may have a reduced-size memory 830 or a reduced-size buffer 850 and may reduce the time taken to store the data in the memory 830 or the buffer 850.

Figure 9:
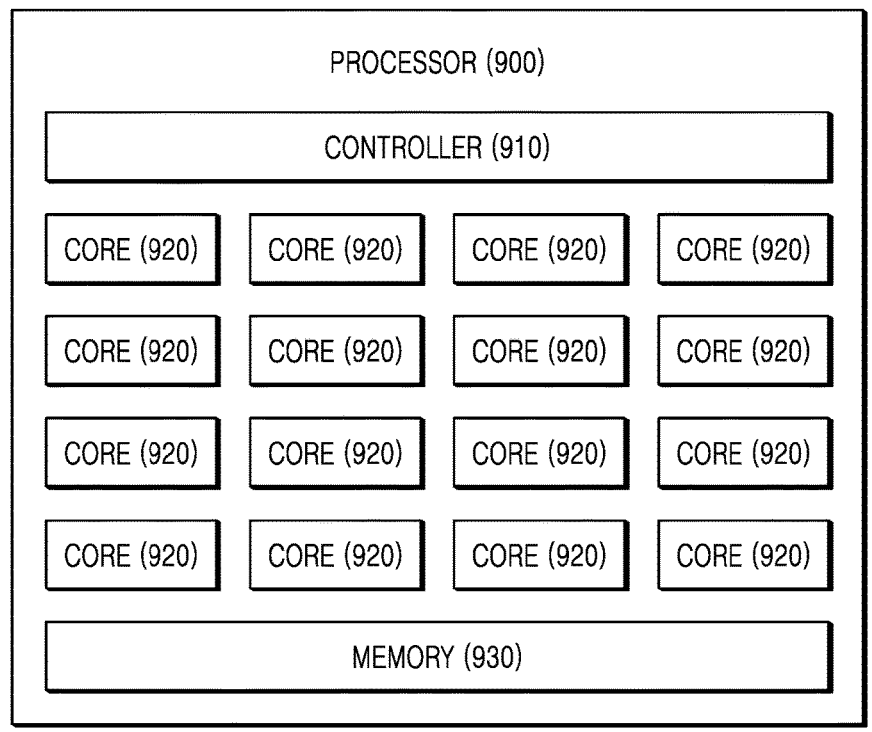
FIG. 9 is a block diagram of an image processing apparatus according to another exemplary embodiment.

FIG. 9 is a block diagram of an image processing apparatus according to another exemplary embodiment. Referring to FIG. 9, a processor 900 may be an example of an image processing apparatus or a Fourier transforming apparatus. Although FIG. 9 illustrates sixteen cores 920, the number of cores 920 is not limited thereto and any number of cores 920 can be included within the processor 900.

A controller 910, a plurality of cores 920, and a memory 930 may be connected to one another and thus may transmit or receive data and/or a control signal to or from one another. The plurality of cores 920 and the memory 930 may be connected to each other, and thus the plurality of cores 920 may write data to the memory 930 or read data from the memory 930.

The processor 900 may include the controller 910, the plurality of cores 920, and the memory 930. The controller 910 controls the plurality of cores 920 and the memory 930. The controller 910 may designate operations that are to be respectively performed by the plurality of cores 920, and allocate data that is to be processed by the plurality of cores 920. For example, when a layer based algorithm is applied to the image data, the controller 910 may allocate image data corresponding to a respective layer to one of the plurality of cores 920.

The plurality of cores 920 may perform image quality correction and/or field calculation or perform pixel encoding.

The plurality of cores 920 may perform a Fourier transform. For example, the plurality of cores 920 may perform a 1D FFT in a row direction or in a column direction. The controller 910 may generate a three-dimensional (3D) image (e.g., hologram image) by using a result of performing the 1D FFT in the row direction or in the column direction.

Figure 10:
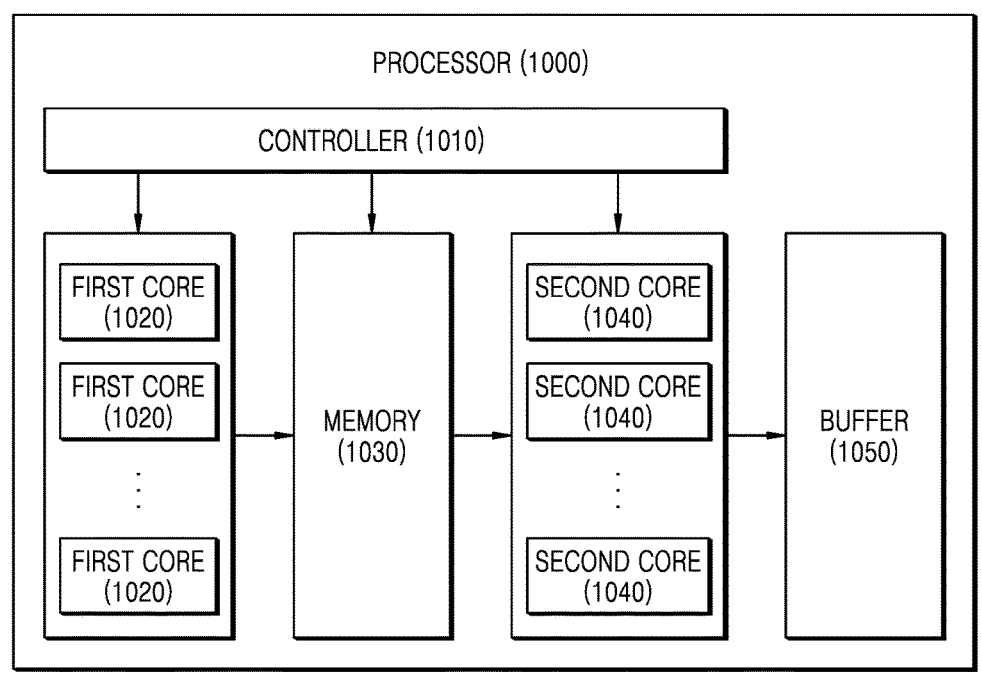
FIG. 10 is a block diagram of an image processing apparatus according to another exemplary embodiment.

FIG. 10 is a block diagram of an image processing apparatus according to another exemplary embodiment. Referring to FIG. 10, a processor 1000 includes a controller 1010, first cores 1020, a memory 1030, second cores 1040, and a buffer 1050.

The first cores 1020 may perform a 1D FFT on data in a row direction or in a column direction. In a case in which the first cores 1020 perform a 1D FFT on the data in the row direction, the second cores 1040 may perform a 1D FFT on the data in the column direction. Alternatively, in a case in which the first cores 1020 perform a 1D FFT on the data in the column direction, the second cores 1040 may perform a 1D FFT on the data in the row direction.

A case in which the first cores 1020 perform a Fourier transform in the row direction will now be illustrated. The first cores 1020 perform a 1D FFT on each row of the data. In detail, each of the first cores 1020 receives data in a direction of each row of the data, perform a 1D FFT on the received data, and output transformed data to the memory 1030. Accordingly, the number of first cores 1020 may be the same as that of rows of the data. However, exemplary embodiments are not limited thereto.

The memory 1030 stores the transformed data in the row direction. The memory 1030 may store only partial data from among the transformed data.

The second cores 1040 perform a 1D FFT on each column of the partial data stored in the memory 1030. In detail, each of the second cores 1040 receives data in a direction of each column of the transformed data, perform a 1D FFT on the received data, and output transformed data to the buffer 1050. Accordingly, the number of second cores 1040 may be the same as that of columns of the partial data. However, exemplary embodiments are not limited thereto.

The controller 1010 may generate a three-dimensional (3D) image (e.g., hologram image) by using a result of performing the 1D FFT by the second cores 1040.

Figure 11:
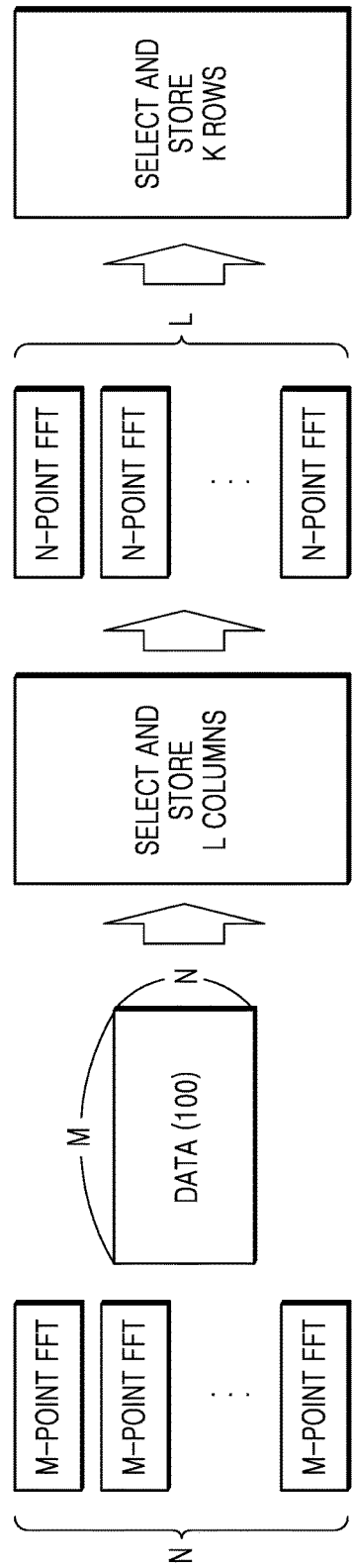
FIG. 11 is a block diagram for explaining a Fourier transforming method according to a size of data.

FIG. 11 is a block diagram for explaining a Fourier transforming method according to a size of data. For convenience of explanation, FIG. 11 illustrates an example in which the image processing apparatus of FIG. 10 performs a Fourier transform on data 100 having an N×M matrix form.

N first cores 1020 may perform an M-point FFT on each row of the data 100. Since the data 100 includes N rows, the N first cores 1020 may be used. Since the data 100 includes M columns, each of the first cores 1020 performs an M-point FFT. The M-point FFT denotes a 1D FFT performed on M number of pixels.

The memory 1030 stores L pieces of column data. Transformed data obtained by the first cores 1020 has a size of N×M, but only a portion of the N×M transformed data is stored in the memory 1030. For example, L pieces of column data from among the N×M transformed data may be stored in the memory 1030, wherein L is a natural number smaller than M.

L second cores 1040 may perform an N-point FFT. Since data stored in the memory 1030 includes the L pieces of column data, the L second cores 1040 may be used. Since the L pieces of column data include N rows, each of the second cores 1040 performs an N-point FFT on each column of the L pieces of column data.

Data output by the second cores 1040 may have an N×L matrix form. However, some rows may be selected from the N×L data. For example, when K rows are selected (K being a natural number smaller than N), the buffer 1050 may store K×L data. For example, the K rows may be middle rows from among the N×L data. Accordingly, the buffer 1050 may have a size sufficient to store data having a size of K×L.

Figure 12:
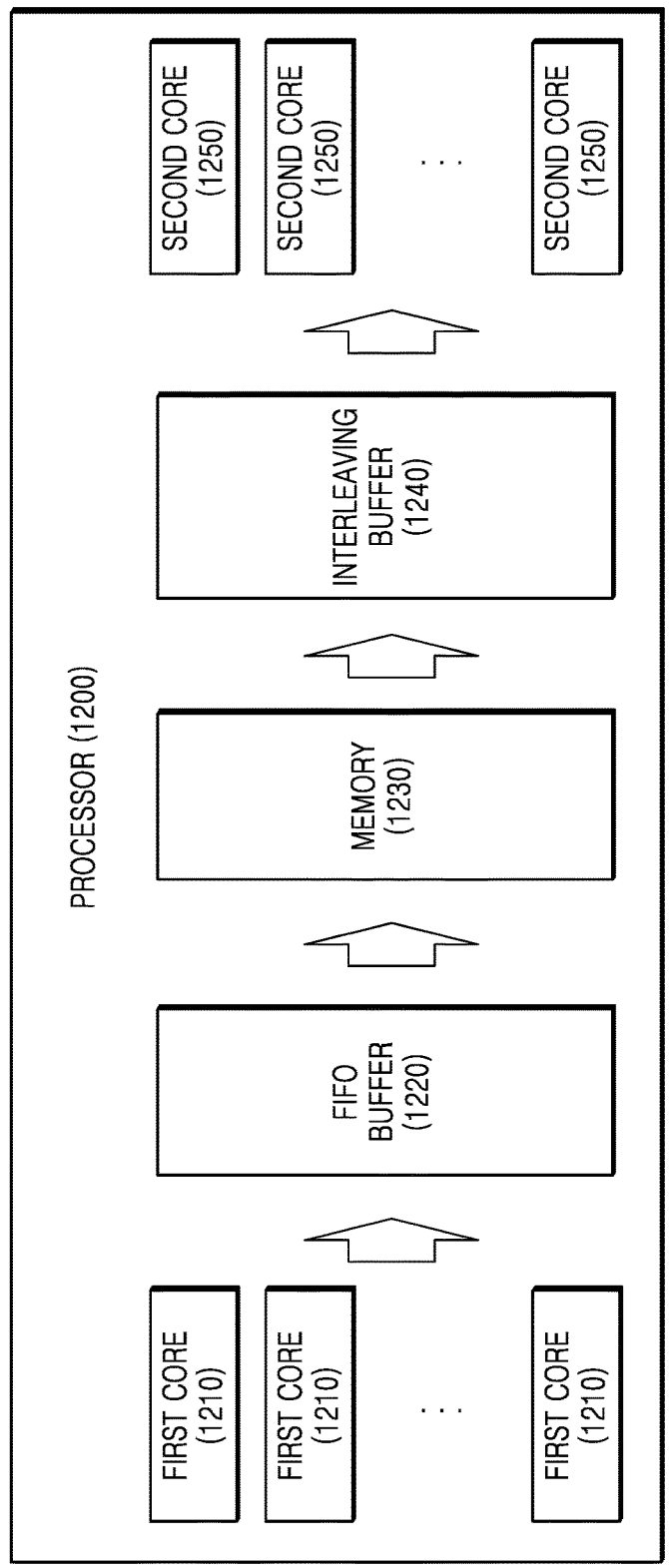
FIG. 12 is a block diagram of an image processing apparatus according to another exemplary embodiment.

FIG. 12 is a block diagram of an image processing apparatus according to another exemplary embodiment. Referring to FIG. 12, a processor 1200 includes first cores 1210, a memory 1230, second cores 1250, a first in, first out (FIFO) buffer 1220, and an interleaving buffer 1240.

The first cores 1210 may perform a 1D FFT on data in a row direction and output transformed data to the FIFO buffer 1220.

The FIFO buffer 1220 stores data output by the first cores 1210 and sequentially output the stored data to the memory 1230. The FIFO buffer 1220 may output only a portion of the stored data to the memory 1230. For example, as described above with reference to FIG. 11, the FIFO buffer 1220 may output data having a size of N×L to the memory 1230.

The interleaving buffer 1240 may output data received from the memory 1230 to the second cores 1250. The interleaving buffer 1240 may output the N×L data to each of the second cores 1250 so that the second cores 1250 may perform a 1D FFT on the N×L data in the column direction. For example, the interleaving buffer 1240 may output, to a first second core 1250, first column data in a form of N×1 from among the N×L data, in a form of 1×N. In other words, the interleaving buffer 1240 outputs data, stored in an N×1 form in the memory 1230, in a 1×N form.

The second cores 1250 perform a 1D FFT on received data. Since each of the second cores 1250 receives 1×N data, each of the second cores 1250 performs a 1D FFT on the received 1×N data.

Data on which a Fourier transform is to be performed is selected from the entire data, and the Fourier transform is performed on the selected data, and thus a calculation amount generated when the Fourier transform is performed is reduced.

In addition, data on which a Fourier transform is to be performed is selected from the entire data, and only the selected data is stored in a memory, and thus a memory space that is used when the Fourier transform is performed is reduced.

Moreover, data on which a Fourier transform is performed is reduced, and thus the number of cores that perform a Fourier transform may be reduced.

The apparatuses according to exemplary embodiments may comprise a memory to store program data, a processor to execute the program data, a permanent storage unit such as a disk drive, a communication port to handle communications with external devices, and user interface devices, including a touch panel, keys, buttons, etc. When software modules or algorithms are involved, the software modules or algorithms may be stored as program instructions and/or computer readable codes executable on a processor, in a computer-readable medium. Examples of the computer readable recording medium include magnetic storage media (e.g., read-only memories (ROMs), random-access memories (RAMs), floppy disks, hard disks, etc.), and optical recording media (e.g., compact disk (CD)-ROMs, or digital versatile disks (DVDs)). The computer readable recording medium can also be distributed over network coupled computer systems so that the computer readable code is stored and executed in a distributive manner. This media can be read by the computer, stored in the memory, and executed by the processor.

Exemplary embodiments may be described in terms of functional block components and/or various processing steps. Such functional blocks may be realized by any number of hardware and/or software components configured to perform the specified functions. For example, exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the exemplary embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the exemplary embodiments may employ any number of conventional techniques for electronics configuration, signal processing and/or control, data processing and the like. The words "mechanism," "element," "means," and "configuration" are used broadly and are not limited to mechanical or physical embodiments, but may include software routines in conjunction with processors, etc.

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The particular implementations shown and described herein are illustrative examples and are not intended to otherwise limit the scope of the disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus.

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The disclosure is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

The exemplary embodiments should be considered in descriptive sense only and not for purposes of limitation. Descriptions of features or aspects within each embodiment should typically be considered as available for other similar features or aspects in other embodiments.

Although a few embodiments have been shown and described, it would be appreciated by those skilled in the art that changes may be made in example embodiments without departing from the principles and spirit of the disclosure, the scope of which is defined in the claims and their equivalents.

What is claimed is:

1. A method of performing a Fourier transform on an image data, the method comprising:
    generating a first image data by performing a one-dimensional (1D) Fast Fourier Transform (FFT), on the image data having rows and columns, in a row direction;
    storing a portion of the first image data;
    generating a second image data by performing the 1D FFT, on the portion of the first image data, in a column direction;
    storing a portion of the second image data; and
    outputting the portion of the second image data to display a final image,
    wherein the generating the first image data comprises completing the 1D FFT on the rows of the image data in the row direction when the portion of the first image data is generated,
    wherein the generating the second image data comprises completing the 1D FFT on columns of the portion of the first image data in the column direction when the portion of the second image data is generated,
    wherein the portion of the first image data comprises a low frequency component from among the first image data, and
    wherein the portion of the second image data comprises a low frequency component from among the second image data.

2. The method of claim 1, wherein the portion of the first image data is based on a portion of columns of the first image data.

3. The method of claim 1, wherein the storing the portion of the second image data comprises storing a portion of rows of the second image data in a buffer.

4. A method of performing a Fourier transform on an image data, the method comprising:
    generating a first image data by performing a one-dimensional (1D) Fast Fourier Transform (FFT), on the image data having rows and columns, in a column direction;
    storing a portion of the first image data in a memory;
    generating a second image data by performing the 1D FFT, on the portion of the first image data, in a row direction;
    storing a portion of the second image data; and
    outputting the portion of the second image data to display a final image,
    wherein the generating the first image data comprises completing the 1D FFT on the columns of the image data in the column direction when the portion of the first image data is generated,
    wherein the generating the second image data comprises completing the 1D FFT on rows of the portion of the first image data in the row direction when the portion of the second image data is generated, wherein the portion of the first image data comprises a low frequency component from among the first image data, and wherein the portion of the second image data comprises a low frequency component from among the second image data.

5. An image processing apparatus for performing a Fourier transform, the image processing apparatus comprising:
at least one processor configured to execute processor-executable instructions, the processor comprising:
a first core configured to generate a first image data by performing a one-dimensional (1D) Fast Fourier Transform (FFT), on an image data having rows and columns, in a row direction;
a memory configured to store a portion of the first image data;
a second core configured to generate a second image data by performing the 1D FFT, on the portion of the first image data, in a column direction; and
a buffer configured to store a portion of the second image data, and output the portion of the second image data to display a final image,
wherein the generating the first image data comprises completing the 1D FFT on the rows of the image data in the row direction when the portion of the first image data is generated,
wherein the generating the second image data comprises completing the 1D FFT on columns of the portion of the first image data in the column direction when the portion of the second image data is generated,
wherein the portion of the first image data comprises a low frequency component from among the first image data, and
wherein the portion of the second image data comprises a low frequency component from among the second image data.

6. The image processing apparatus of claim 5, wherein the portion of the first image data corresponds to a portion of columns of the first image data.

7. The image processing apparatus of claim 5, wherein the portion of the second image data corresponds to a portion of rows of the second image data.

8. An image processing apparatus for performing a Fourier transform, the image processing apparatus comprising:
at least one processor configured to execute processor-executable instructions, the at least one processor comprising:
a first core configured to generate a first image data by performing a one-dimensional (1D) Fast Fourier Transform (FFT), on an image data having rows and columns, in a column direction;
a memory configured to store a portion of the first image data from among the first image data;
a second core configured to generate a second image data by performing the 1D FFT, on the portion of the first image data, in a row direction; and
a buffer configured to store a portion of the second image data, and output the portion of the second image data to display a final image,
wherein the generating the first image data comprises completing the 1D FFT on the columns of the image data in the column direction when the portion of the first image data is generated,
wherein the generating the second image data comprises completing the 1D FFT on rows of the portion of the first image data in the row direction when the portion of the second image data is generated, wherein the portion of the first image data comprises a low frequency component from among the first image data, and wherein the portion of the second image data comprises a low frequency component from among the second image data.

9. A non-transitory computer-readable recording medium having recorded thereon a computer program, which, when executed by a computer, causes the computer to perform the method of claim 1.

10. An image processing apparatus for performing a Fourier transform, the image processing apparatus comprising:
at least one processor configured to execute processor-executable instructions, the at least one processor comprising:
N first cores, wherein N being a natural number of 2 or greater, configured to generate a first image data by performing a one-dimensional (1D) Fast Fourier Transform (FFT), on an image data having an N×M matrix form, wherein M being a natural number of 2 or greater, in a row direction;
a memory configured to store L columns of the first image data, wherein L being a natural number smaller than M;
L second cores configured to perform the 1D FFT on the L columns of the first image data to generate a second image data, in a column direction; and
a buffer configured to store a portion of the second image data output by the L second cores, and output the portion of the second image data to display a final image,
wherein the generating the first image data comprises completing the 1D FFT on the rows of the image data in the row direction when the portion of the first image data is generated,
wherein the generating the second image data comprises completing the 1D FFT on columns of the portion of the first image data in the column direction when the portion of the second image data is generated,
wherein the portion of the first image data comprises a low frequency component from among the first image data, and
wherein the portion of the second image data comprises a low frequency component from among the second image data.

11. The image processing apparatus of claim 10, wherein the N first cores respectively perform an M-point FFT.

12. The image processing apparatus of claim 10, wherein the L second cores respectively perform an N-point FFT.

13. The image processing apparatus of claim 10, further comprising a First IN, First Out (FIFO) buffer configured to store the first image data and output L columns selected from M columns of the first image data to the memory.

14. The image processing apparatus of claim 10, further comprising an interleaving buffer configured to output the L columns of the first image data, received from the memory, to the L second cores, respectively.

15. An image processing apparatus for performing a Fourier transform, the image processing apparatus comprising:
at least one processor configured to execute processor-executable instructions, the at least one processor comprising:
first cores configured to generate a first image data by performing a one-dimensional (1D) Fast Fourier Transform (FFT), on an image data having rows and columns, in a column direction;

a memory configured to store a portion of the first image data;

second cores configured to generate a second image data by performing the 1D FFT, on the portion of the first image data, in a row direction; and a buffer configured to store a portion of the second image data, and output the portion of the second image data to display a final image, wherein a number of the first cores corresponds to a number of columns of the image data, and a number of the second cores corresponds to a number of rows of the portion of the first image data, wherein the generating the first image data comprises completing the 1D FFT on the columns of the image data in the column direction when the portion of the first image data is generated, wherein the generating the second image data comprises completing the 1D FFT on rows of the portion of the first image data in the row direction when the portion of the second image data is generated, wherein the portion of the first image data comprises a low frequency component from among the first image data, and wherein the portion of the second image data comprises a low frequency component from among the second image data.

\* \* \* \* \*